(12) United States Patent
Wakabayashi et al.

(10) Patent No.: US 12,358,500 B2
(45) Date of Patent: Jul. 15, 2025

(54) VEHICLE CONTROL APPARATUS

(71) Applicant: Mitsubishi Electric Corporation, Tokyo (JP)

(72) Inventors: Mizuho Wakabayashi, Tokyo (JP); Yuki Yoshida, Tokyo (JP); Yuko Omagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 179 days.

(21) Appl. No.: 18/303,666

(22) Filed: Apr. 20, 2023

(65) Prior Publication Data

US 2024/0182025 A1 Jun. 6, 2024

(30) Foreign Application Priority Data

Nov. 30, 2022 (JP) ................. 2022-191049

(51) Int. Cl.
*B60W 30/12* (2020.01)
*B60W 30/18* (2012.01)
*B60W 40/06* (2012.01)

(52) U.S. Cl.
CPC ...... *B60W 30/12* (2013.01); *B60W 30/18163* (2013.01); *B60W 40/06* (2013.01); *B60W 2554/80* (2020.02)

(58) Field of Classification Search
CPC ........... B60W 30/12; B60W 30/18145; B60W 40/06; B60W 2552/53; B60W 2554/80; B60W 2710/06; B60W 2710/08; B60W 2710/20
See application file for complete search history.

(56) References Cited

U.S. PATENT DOCUMENTS

| | | | | |
|---|---|---|---|---|
| 11,816,990 B2* | 11/2023 | Yoshikawa | ..... | B60W 30/18163 |
| 12,049,271 B1* | 7/2024 | Saito | ................. | B62D 15/0255 |
| 2017/0371346 A1* | 12/2017 | Mei | ...................... | G05D 1/0274 |
| 2018/0113210 A1* | 4/2018 | Izadian | .................. | G01S 13/90 |
| 2020/0298849 A1* | 9/2020 | Tanaka | ................. | B60W 40/04 |
| 2020/0307691 A1* | 10/2020 | Kalabic | .............. | B62D 15/0255 |
| 2022/0101731 A1* | 3/2022 | Yoshikawa | ....... | B60W 30/0956 |
| 2023/0286577 A1* | 9/2023 | Kimura | ........... | B60W 30/18163 |

FOREIGN PATENT DOCUMENTS

JP 6895111 B2 6/2021

* cited by examiner

*Primary Examiner* — Logan M Kraft
*Assistant Examiner* — Johnny H Hoang
(74) *Attorney, Agent, or Firm* — Sughrue Mion, PLLC

(57) ABSTRACT

A vehicle control apparatus includes a lane-changing-cancellation determination unit that cancels lane changing and determines whether or not an own vehicle should return to the original lane, in the case where while the own vehicle performs the lane changing, another vehicle is detected within an area determined by a predetermined longitudinal-direction range and a predetermined transverse-direction range, and a moving-direction determination unit that determines a moving direction of another vehicle, based on another-vehicle information to be acquired by an another-vehicle-information acquisition unit and road information to be acquired by a road-information acquisition unit, wherein the lane-changing-cancellation determination unit changes at least one of the longitudinal-direction range and the transverse-direction range, in accordance with a moving direction of said another vehicle determined by the moving-direction determination unit.

20 Claims, 11 Drawing Sheets

$$v_{w,o} = v_{x,o}\sin(\theta_o) + v_{y,o}\cos(\theta_o)$$

VEHICLE CONTROL APPARATUS

BACKGROUND OF THE INVENTION

Field of the Invention

The present disclosure relates to a vehicle control apparatus.

Description of the Related Art

In a driving assistance technology for assisting vehicle driving, there has been proposed a vehicle control apparatus in which in order to reduce a load on a driver, lane changing or cancellation thereof is performed at an appropriate timing, while considering neighboring vehicles. For example, Patent Document 1 discloses a technology in which in the case where while automatic lane changing is performed, there is recognized another vehicle intruding into a predetermined area, whether or not the lane changing can be continued is determined based on the position of an own vehicle and then the lane changing is continued or cancelled.

It is argued that the conventional technology disclosed in Patent Document 1 makes it possible to prevent an unnatural vehicle behavior such as the case where after lane changing to an adjacent lane has almost been completed, the lane changing is cancelled and then lane changing to the original lane is performed, and to reduce effects to a traffic flow and the occupant.

PRIOR ART REFERENCE

Patent Document

[Patent Document 1] Japanese Patent No. 6895111

SUMMARY OF THE INVENTION

However, in the case where while a sound distance between the own vehicle and another vehicle on an adjacent lane is kept, the own vehicle starts lane changing from the present traveling lane to the adjacent lane and then acceleration or deceleration by said another vehicle makes the own vehicle approach said another vehicle, it is required that the own vehicle cancels the lane changing and returns to the original lane so that the approach to said another vehicle is prevented. On this regard, however, it is appropriate that in the case where another vehicle approaching the own vehicle tries to move away from the adjacent lane through lane changing, the own vehicle continues the lane changing to the adjacent lane, even when the own vehicle is approaching said another vehicle; in contrast, it is appropriate that in the case where another vehicle is trying to perform lane changing to the adjacent lane, the own vehicle cancels the lane changing, although the own vehicle is not approaching said another vehicle. As described above, it is required to control the traveling of the own vehicle, as occasion may demand, in accordance with the behavior of another vehicle.

In the conventional technology disclosed in Patent Document 1, lane changing is suppressed from being cancelled, based on the position of the own vehicle to the lane line of a lane on a road, and the moving direction of another vehicle is not considered; thus, there has been a problem that when the own vehicle cancels lane changing while the probability that own vehicle approaches said another vehicle is low, the occupant of the own vehicle may be made to sense discomfort.

The present disclosure is to disclose a technology for solving the foregoing problem; the objective thereof is to provide a vehicle control apparatus that realizes appropriate traveling of an own vehicle by considering the moving direction of another vehicle.

A vehicle control apparatus disclosed in the present disclosure includes
- an own-vehicle-state acquisition unit that acquires a state of an own-vehicle,
- an another-vehicle-information acquisition unit that acquires another-vehicle information including a position and a speed of another vehicle traveling on a road on which the own vehicle is traveling,
- a road-information acquisition unit that acquires road information including information on a lane center of an adjacent lane of a lane-changing original lane on which the own vehicle is traveling, and
- a vehicle control unit that performs lane changing by the own vehicle to the adjacent lane, based on the another-vehicle information to be acquired by the another-vehicle-information acquisition unit; the vehicle control apparatus further includes
- a lane-changing-cancellation determination unit that cancels the lane changing and determines whether or not the own vehicle should return to the lane-changing original lane, in the case where while the lane changing is performed, another vehicle is detected within an area determined by a predetermined longitudinal-direction range and a predetermined transverse-direction range, and
- a moving-direction determination unit that determines a moving direction of said another vehicle, based on the another-vehicle information to be acquired by the another-vehicle-information acquisition unit and the road information to be acquired by the road-information acquisition unit; the vehicle control apparatus is characterized in that the lane-changing-cancellation determination unit changes at least one of the longitudinal-direction range and the transverse-direction range, in accordance with a moving direction of said another vehicle determined by the moving-direction determination unit.

The present disclosure makes it possible to obtain a vehicle control apparatus that realizes appropriate traveling of an own vehicle, while considering the moving direction of another vehicle.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
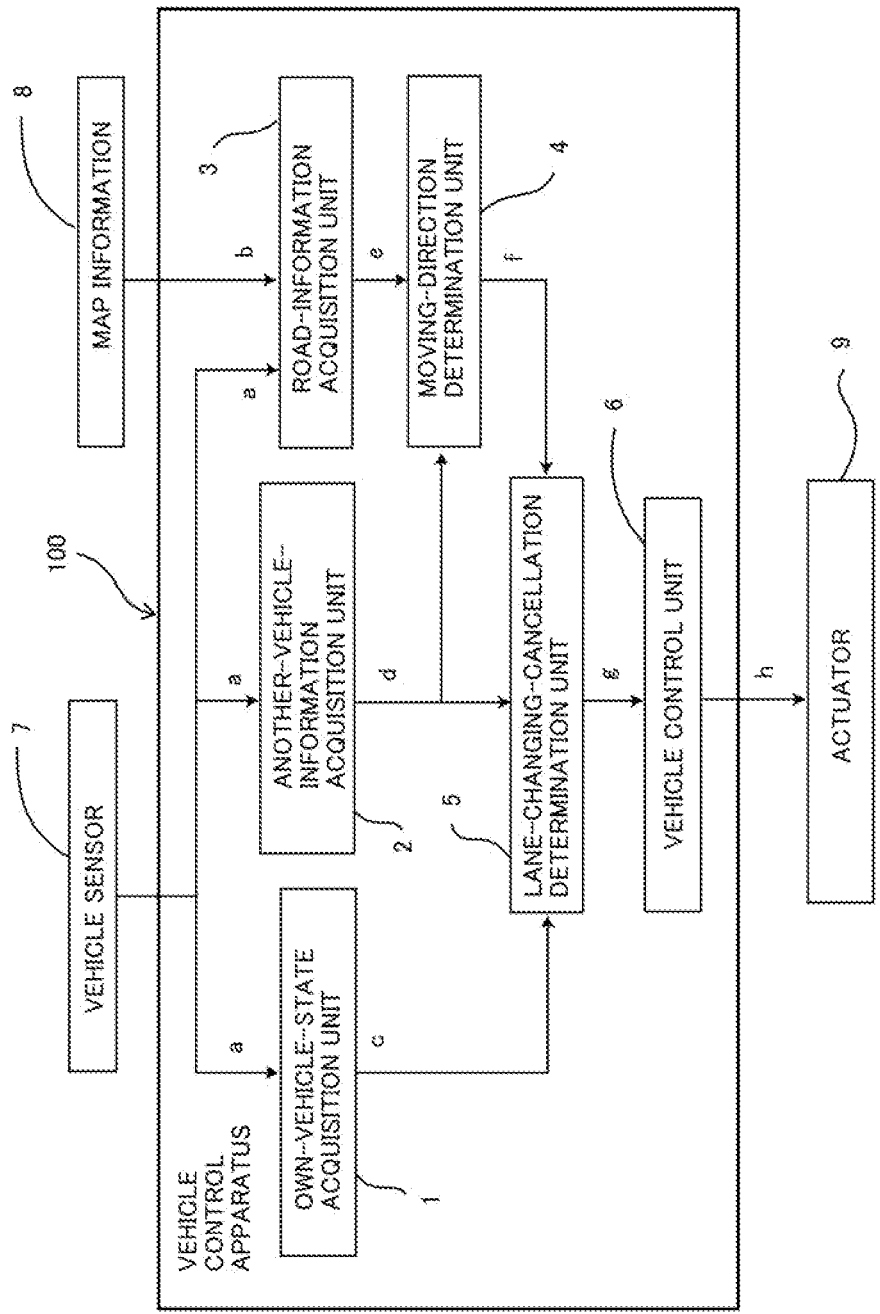
FIG. 1 is a block diagram representing the configuration of a vehicle control apparatus according to Embodiment 1.

Hereinafter, a vehicle control apparatus according to Embodiment 1 will be explained based on the drawings. FIG. 1 is a block diagram representing the configuration of the vehicle control apparatus according to Embodiment 1. In FIG. 1, a vehicle control apparatus 100 has an own-vehicle-state acquisition unit 1, an another-vehicle-information acquisition unit 2, a road-information acquisition unit 3, a moving-direction determination unit 4, a lane-changing-cancellation determination unit 5, and a vehicle control unit 6. A vehicle sensor 7 includes sensor apparatuses, such as a vehicle-speed sensor, an acceleration sensor, a yaw-rate sensor, a camera, a radar, a LiDAR (Light Detection and Ranging) for performing detection and distance-measurement by means of light, and a GPS (Global Positioning System), that are mounted in an own vehicle. Map information 8 includes map data to be obtained from the outside of the own vehicle or incorporated in the own vehicle.

At least the vehicle control unit 6, the lane-changing-cancellation determination unit 5, and the moving-direction determination unit 4 in the vehicle control apparatus 100 are configured with an ECU (Electronic Control Unit) in the own vehicle. In addition, the whole of the vehicle control apparatus 100 may be configured with the ECU in the own vehicle.

Figure 12:
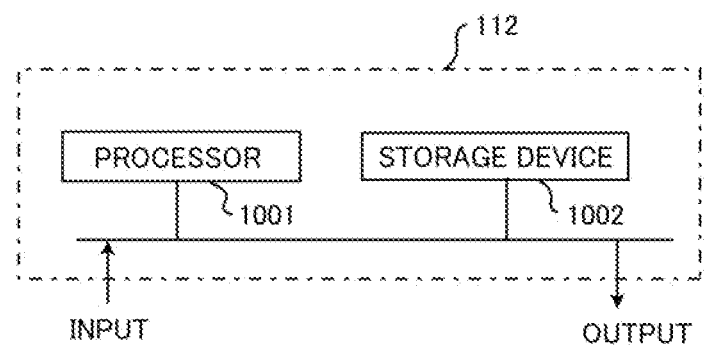
FIG. 12 is a block diagram representing an example of hardware configuration of an ECU included in the vehicle control apparatus according to Embodiment 1.

FIG. 12 is a block diagram representing an example of hardware configuration of the foregoing ECU that configures at least part of the vehicle control apparatus 100 according to Embodiment 1. As represented in FIG. 12, an ECU 112 includes a processor 1001 and a storage apparatus 1002. Although not illustrated, the storage apparatus 1002 has a volatile storage device such as a random access memory and a nonvolatile auxiliary storage device such as a flash memory. The processor 1001 executes a program inputted from the storage apparatus 1002. In this case, the program is inputted from the auxiliary storage device to the processor 1001 by way of the volatile storage device. Moreover, the processor 1001 may either output data such as a calculation result to the volatile storage device of the storage apparatus 1002 or store the data in the auxiliary storage device by way of the volatile storage device.

In FIG. 1, based on a signal a from the vehicle sensor 7, the own-vehicle-state acquisition unit 1 acquires an own-vehicle state, such as the speed and the acceleration of the own vehicle, that indicates the traveling state of the own vehicle; then, based on the acquired own-vehicle state, the own-vehicle-state acquisition unit 1 outputs a signal c including information that indicates the traveling state of the own vehicle. Based on the signal a from the vehicle sensor 7, the another-vehicle-information acquisition unit 2 acquires another-vehicle information, such as the position, the speed, and the acceleration of another vehicle, that indicates the traveling state of said another vehicle; then, based on the acquired another-vehicle information, the another-vehicle-information acquisition unit 2 outputs a signal d including information that indicates the traveling state of said another vehicle. Based on the signal a from the vehicle sensor 7 and a signal b from the map information 8, the road-information acquisition unit 3 acquires road information items such as the position of a lane on which the own vehicle travels and the position of the lane center of an adjacent lane, and outputs a signal e including the acquired road information items.

Based on the signal d from the another-vehicle-information acquisition unit 2 and the signal e from the road-information acquisition unit 3, the moving-direction determination unit 4 determines the moving direction of said another vehicle. As the determination on the moving direction of said another vehicle, for example, whether or not said another vehicle is traveling straight ahead, whether or not said another vehicle is moving toward the outside of the adjacent lane, whether or not said another vehicle is moving toward the inside of the adjacent lane, whether or not said another vehicle is moving toward a lane-changing original lane of the own vehicle, and the like are determined; then, the moving-direction determination unit 4 outputs a signal f indicating the determination result. Based on the result of the moving-direction determination by the moving-direction determination unit 4, the lane-changing-cancellation determination unit 5 determines whether or not the own vehicle should cancel its lane changing, so that lane-changing cancellation under the situation where the necessity of the lane-changing cancellation is low can be suppressed or so that lane-changing cancellation under the situation where the necessity of the lane-changing cancellation is high can be facilitated.

While the own vehicle performs lane changing, the lane-changing-cancellation determination unit 5 determines whether or not the lane changing should be cancelled, based on the speed of the own vehicle, the position and speed of another vehicle, and the moving direction of said another vehicle, determined by the moving-direction determination unit 4. Specifically, when said another vehicle is detected within an area determined by a predetermined-distance range in the transverse direction of the road and a predetermined-distance range in the longitudinal direction of the road, the lane-changing-cancellation determination unit 5 determines that the lane changing by the own vehicle is to be cancelled; when said another vehicle is not detected within the foregoing area, the lane-changing-cancellation determination unit 5 determines that the lane changing by the own vehicle is to be continued. The lane-changing-cancellation determination unit 5 outputs a signal g corresponding to the determination result.

The vehicle control unit 6 outputs a signal h for performing vehicle control such as maintaining a target speed of the own vehicle, maintaining a traveling lane on which the own vehicle travels, lane changing from the traveling lane to an adjacent lane, or cancelling lane changing in which when performing its lane changing, the own vehicle returns to a lane-changing original lane. The actuator 9 provided in the own vehicle includes two or more actuators that operate, for example, a power steering apparatus, a throttle valve, a braking system, an ignition system, and the like, respectively; the actuator 9 operates based on the signal h from the vehicle control unit 6.

Figure 2:
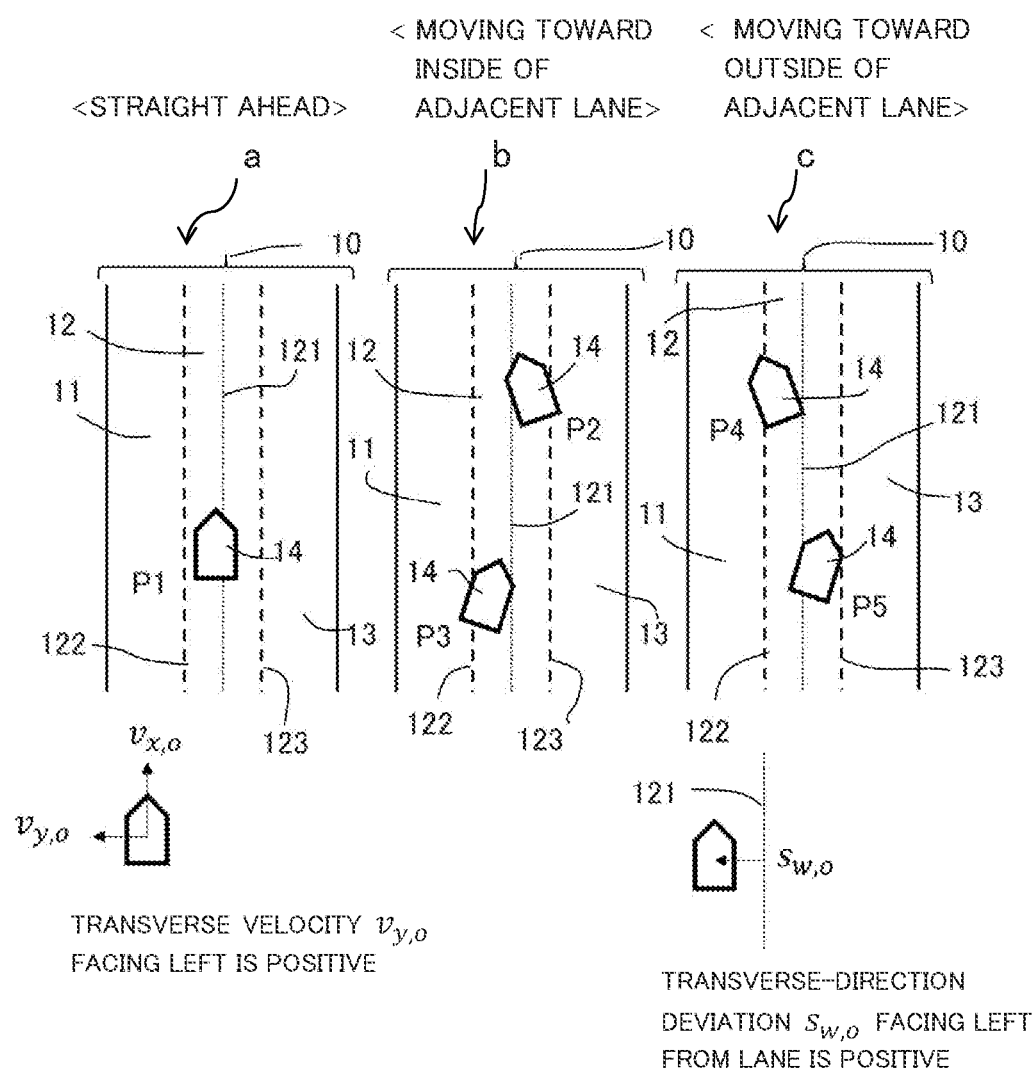
FIG. 2 is a set of explanatory charts for explaining how to determine a moving direction of another vehicle, in the vehicle control apparatus according to Embodiment 1.

Next, there will be explained a method in which the moving-direction determination unit 4 determines the moving direction of another vehicle. FIG. 2 is a set of explanatory charts for explaining how to determine the moving direction of another vehicle, in the vehicle control apparatus according to Embodiment 1; FIG. 2 represents an example of determination on the moving direction of another vehicle 14 at a time when the own vehicle (unillustrated) performs lane changing to the right in the traveling direction (upward in FIG. 2).

Each of parts (a), (b), and (c) in FIG. 2 has a lane-changing original lane 11, a lane-changing destined lane 12 as an adjacent lane to which the own vehicle is trying to perform lane-changing, and a lane-changing further destined lane 13 for which the own vehicle is further destined from the lane-changing destined lane 12. A lane center 121 indicates the center of the lane-changing destined lane 12. The part (a) in FIG. 2 represent the case where it is determined that another vehicle 14 is traveling straight ahead, the part (b) in FIG. 2 represent the case where it is determined that another vehicle 14 is moving to the inside of the lane-changing destined lane 12 as an adjacent lane, and the part (c) in FIG. 2 represent the case where it is determined that another vehicle 14 is moving to the outside of the lane-changing destined lane 12 as the adjacent lane, respectively. In addition, in the following explanation, the lane-changing destined lane 12 may be referred to also as an adjacent lane.

As the determination on the moving direction of another vehicle 14, performed by the moving-direction determination unit 4, there exists a determination method of determining the moving direction of another vehicle 14, with respect to the lane center 121 of the lane-changing destined lane 12 adjacent to the lane-changing original lane 11 on which the own vehicle is traveling. The determination patterns in this case include a first determination pattern, a second determination pattern, and a third determination pattern, described below.

In other words, the first determination pattern is a determination pattern in which it is determined that another vehicle 14 is traveling straight ahead, and corresponds to the determination pattern represented in the part (a) in FIG. 2. The second determination pattern is a determination pattern in which it is determined that another vehicle 14 is traveling toward the inside of the lane-changing destined lane 12 adjacent to the lane-changing original lane 11, and corresponds to the determination pattern represented in the part (b) in FIG. 2. The third determination pattern is a determination pattern in which it is determined that another vehicle 14 is traveling toward the outside of the lane-changing destined lane 12 adjacent to the lane-changing original lane 11, and corresponds to the determination pattern represented in the part (c) in FIG. 2.

In addition, instead of the foregoing determination method, there exists a determination method in which it is determined in which of the directions toward the lane-changing original lane 11 and toward the lane-changing destined lane 12 another vehicle 14 is moving. The determination patterns in this case include a fourth determination pattern, a fifth determination pattern, a sixth determination pattern, and a seventh determination pattern.

In other words, the fourth determination pattern is a determination pattern in which it is determined that another vehicle 14 is moving toward the lane-changing destined lane 12 of the own vehicle; the fifth determination pattern is a determination pattern in which it is determined that another vehicle 14 is moving toward the lane-changing original lane 11. The sixth determination pattern is a determination pattern in which it is determined that another vehicle 14 is moving toward the lane-changing further destined lane 13 that is farther from the lane-changing destined lane 12. The seventh determination pattern is a determination pattern determining ineffectiveness; it is the case where another vehicle is moving toward another place, which is none of the lane-changing original lane 11, the lane-changing destined lane 12, and the lane-changing further destined lane 13.

In the case where the determination is performed with respect to the position of the lane center 121 of the lane-changing destined lane 12 adjacent to the lane-changing original lane 11 on which the own vehicle is traveling, the moving direction of another vehicle 14 is determined as represented in Table 1 below, based on the transverse velocity of another vehicle 14, the transverse-direction deviation of another vehicle 14 with respect to the lane center 121 of the lane-changing destined lane 12, and the transverse-velocity threshold value for another vehicle 14 on which determination of straight-ahead traveling is performed. In this situation, the transverse velocity of another vehicle 14 is expressed as in notation (1) below; the transverse-direction deviation of another vehicle 14 with respect to the lane center 121 of the lane-changing destined lane 12 is expressed as in notation (2) below; the transverse-velocity threshold value for another vehicle 14 on which determination of straight-ahead traveling is performed is expressed as in notation (3) below.

Transverse velocity of another vehicle: $v_{y,o}$ . . . notation (1)

Transverse-direction deviation of another vehicle with respect to the lane center of the lane-changing destined lane: $s_{w,o}$ . . . notation (2)

Transverse-velocity threshold value for another vehicle on which determination of straight-ahead traveling is performed: $v_{y,thr}$ . . . notation (3)

(transverse-velocity threshold value is, for example, 0.5 [m/s])

The transverse-direction deviation of another vehicle 14 with respect to the lane center 121 of the lane-changing destined lane 12 adjacent to the lane-changing original lane 11 on which the own vehicle travels, which is represented in the foregoing notation (2), can be obtained based on the positional information on the lane center 121 of the lane-changing destined lane 12, obtained from the road-information acquisition unit 3, and the positional information on another vehicle 14 obtained from the another-vehicle-information acquisition unit 2. In addition, the transverse-direction deviation of another vehicle 14, represented in the foregoing notation (2), is a value having a sign; in this case, a "positive" sign designates the left direction of the lane-changing destined lane 12 and a "negative" sign designates the right direction thereof. The moving direction of another vehicle 14 is determined as represented in Table 1 below.

TABLE 1

| determination pattern | moving direction | | condition (AND condition) | |
| --- | --- | --- | --- | --- |
| | direction for adjacent lane | lane of destination | transverse velocity | transverse-direction deviation |
| P1 | straight ahead | ineffective | $\|v_{y,o}\| \leq v_{y,thr}$ | no condition |
| P2 | inside of adjacent lane | toward lane-changing destined lane | $v_{y,o} > v_{y,thr}$ | $s_{w,o} \leq 0$ |
| P3 | | toward lane-changing destined lane | $v_{y,o} < -v_{y,thr}$ | $s_{w,o} \geq 0$ |
| P4 | outside of adjacent lane | toward lane-changing original lane | $v_{y,o} > v_{y,thr}$ | $s_{w,o} > 0$ |
| P5 | | toward lane-changing further destined lane | $v_{y,o} < -v_{y,thr}$ | $s_{w,o} < 0$ |

With regard to the transverse velocity $v_{y,o}$ of another vehicle, the left direction of the vehicle front is a positive direction.

The determination patterns P1, P2, P3, P4, an P5 represented in Table 1 correspond to the determination patterns P1, P2, P3, P4, an P5, respectively, represented in the part (a), (b), and (c) in FIG. 2.

In the determination on the moving direction of another vehicle 14, represented in Table 1, to which one of the left and right directions another vehicle 14 is moving is determined based on the transverse velocity of another vehicle 14; however, this can be replaced by a movement prediction based on the winker lighting state of another vehicle. Table 2 below represents the determination on the moving direction of another vehicle, performed based on the winker lighting state of another vehicle.

TABLE 2

| determination pattern | moving direction | | condition (AND condition) | |
| --- | --- | --- | --- | --- |
| | direction for adjacent lane | lane of destination | winker state | transverse-direction deviation |
| P1 | straight ahead | ineffective | turned off | no condition |
| P2 | inside of adjacent lane | toward lane-changing destined lane | left winker on | $s_{w,o} \leq 0$ |
| P3 | | toward lane-changing destined lane | right winker on | $s_{w,o} \geq 0$ |
| P4 | outside of adjacent | toward lane-changing original lane | left winker on | $s_{w,o} > 0$ |
| P5 | lane | toward lane-changing further destined lane | right winker on | $s_{w,o} < 0$ |

The determination patterns P1, P2, P3, P4, an P5 represented in Table 2 correspond to the determination patterns P1, P2, P3, P4, an P5, respectively, represented in the parts (a), (b), and (c) in FIG. 2.

Next, there will be explained the case where the moving direction of another vehicle is determined with respect to the position of the lane line of the lane-changing destined lane 12 as an adjacent lane. In this case, the moving direction of another vehicle 14 is determined based on the transverse-direction deviation of another vehicle 14 with respect to the position of the left lane line 122 of the lane-changing destined lane 12 and the transverse-direction deviation of another vehicle 14 with respect to the position of the right lane line 123 of the lane-changing destined lane 12.

In this case, the transverse-direction deviation of another vehicle 14 with respect to the position of the left lane line 122 of the lane-changing destined lane 12 is represented as in the notation (4) below, and the transverse-direction deviation of another vehicle 14 with respect to the position of the right lane line 123 of the lane-changing destined lane 12 is represented as in the notation (5) below.

Transverse-direct ion deviation with respect to the position of the left lane line of adjacent lane: $s_{w,o,1}$ . . . notation (4)

Transverse-direction deviation with respect to the position of the right lane line of adjacent lane: $s_{w,o,2}$ . . . notation (5)

The transverse-direction deviation of another vehicle 14 with respect to the position of the left lane line 122 of the lane-changing destined lane 12 as an adjacent lane and the transverse-direction deviation of another vehicle 14 with respect to the position of the right lane line 123 of the lane-changing destined lane 12 as the adjacent lane can be obtained based on the positional information on the lane line of the adjacent lane, obtained from the road-information acquisition unit 3, and the positional information on another vehicle 14, obtained from the another-vehicle-information acquisition unit 2. In addition, the transverse-direction deviation of another vehicle, represented in each of the foregoing notations (4) and (5), is a value having a sign; in this case, a "positive" sign designates the left direction of each of the left lane line 122 and the right lane line 123 and a "negative" sign designates the right direction thereof.

Table 3 below represents the determination on the moving direction of another vehicle 14, to be performed with respect to the respective positions of the left lane line 122 and the right lane line 123 of the lane-changing destined lane 12 as an adjacent lane.

TABLE 3

| determination pattern | moving direction | | condition (AND condition) | |
|---|---|---|---|---|
| | direction for adjacent lane | lane of destination | transverse velocity | transverse-direction deviation |
| P1 | straight ahead | ineffective | $|v_{y,o}| \leq v_{y,thr}$ | no condition |
| P2 | inside of adjacent lane | toward lane-changing destined lane | $v_{y,o} > v_{y,thr}$ | $|s_{w,o,1}| \geq |s_{w,o,2}|$ |
| P3 | | toward lane-changing destined lane | $v_{y,o} > -v_{y,thr}$ | $|s_{w,o,1}| < |s_{w,o,2}|$ |
| P4 | outside of adjacent lane | toward lane-changing original lane | $v_{y,o} > v_{y,thr}$ | $|s_{w,o,1}| < |s_{w,o,2}|$ |
| P5 | | toward lane-changing further destined lane | $v_{y,o} < -v_{y,thr}$ | $|s_{w,o,1}| \geq |s_{w,o,2}|$ |

Figure 3:
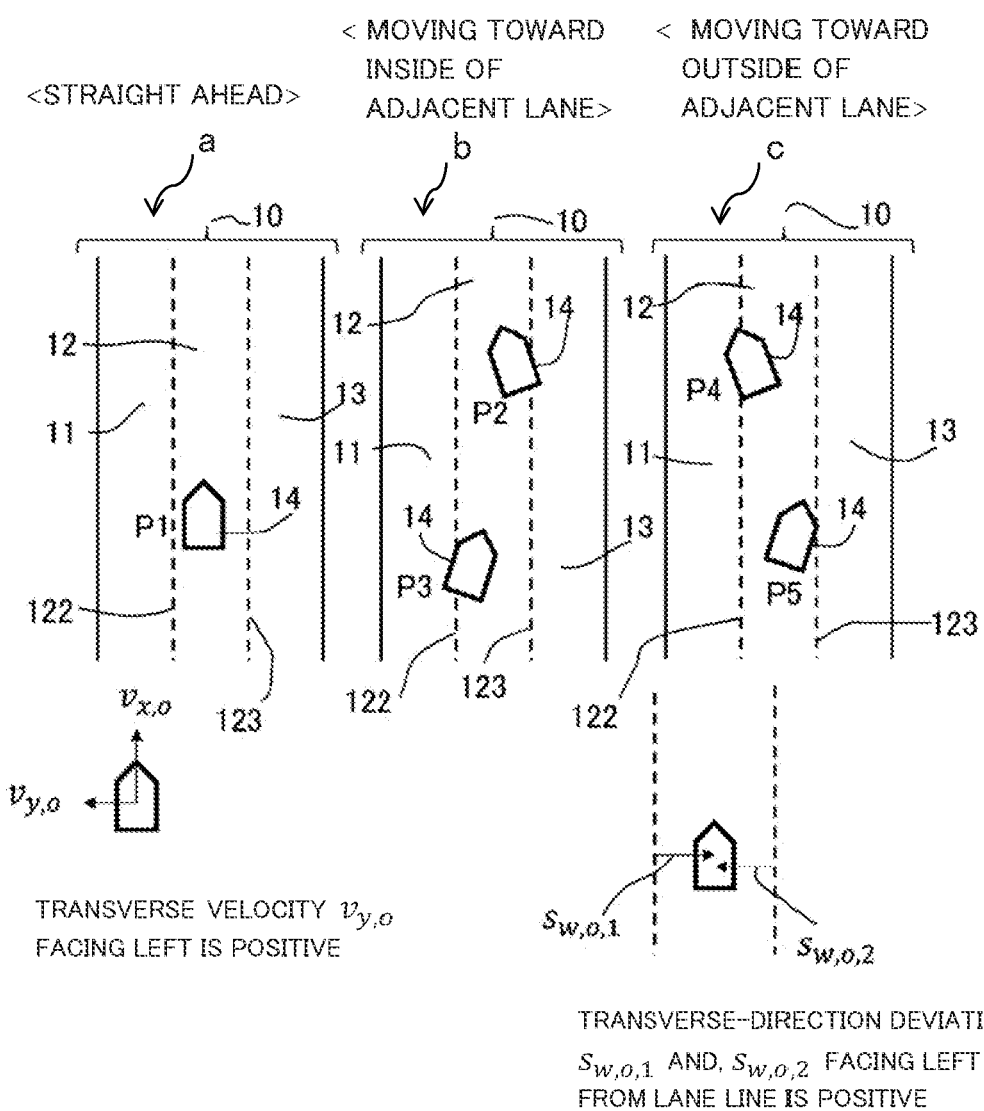
FIG. 3 is a set of explanatory charts for a case where the determine on the moving direction of said another vehicle is performed through a method different from that in FIG. 2, in the vehicle control apparatus according to Embodiment 1.

FIG. 3 is a set of explanatory charts for a case where the determination on the moving direction of another vehicle is performed through a method different from that in FIG. 2, in the vehicle control apparatus according to Embodiment 1; FIG. 3 represents an example of determination on the moving direction of another vehicle 14 at a time when the own vehicle (unillustrated) performs lane changing to the right in the traveling direction (upward in FIG. 3).

Each of the parts (a), (b), and (c) in FIG. 3 has the lane-changing original lane 11, the lane-changing destined lane 12 as an adjacent lane to which the own vehicle (unillustrated) is trying to perform lane-changing, and the lane-changing further destined lane 13 for which the own vehicle is further destined from the lane-changing destined lane 12. The part (a) in FIG. 3 represent the case where it is determined that another vehicle 14 is traveling straight ahead, the part (b) represent the case where it is determined that another vehicle 14 is moving to the inside of the lane-changing destined lane 12, and the part (c) represent the case where it is determined that another vehicle 14 is moving to the outside of the lane-changing destined lane 12, respectively. In addition, in the following explanation, the lane-changing destined lane 12 may be referred to also as an adjacent lane.

The determination patterns P1, P2, P3, P4, an P5 represented in Table 3 correspond to the determination patterns P1, P2, P3, P4, an P5, respectively, represented in the parts (a), (b), and (c) in FIG. 3.

As is the case, represented in Table 1, where the transverse-direction deviation of another vehicle with respect to the lane center of an adjacent lane is utilized, the determination, represented in Table 3, on the moving direction of another vehicle 14 with respect to each of the left lane line 122 and the right lane line 123 of the lane-changing destined lane 12 may be performed by replacing the condition of the transverse velocity of another vehicle 14 by a movement prediction based on the winker state of another vehicle 14.

In addition, the determination on the moving direction of another vehicle 14 can also be performed by replacing the transverse velocity of another vehicle 14 by the transverse-direction velocity transformed in a direction perpendicular to the center of the road. In this situation, the transverse-direction velocity transformed in the direction perpendicular to the center of the road is represented as in notation (6) below.

Transverse-direction velocity transformed in the direction perpendicular to the center of the road: $v_{w,o}$ ... notation (6)

The transverse-direction velocity of another vehicle, represented in the notation (6), can be obtained from the direction of the road 10 with respect to another vehicle 14, i.e., the direction of the lane-changing destined lane 12, the longitudinal velocity of another vehicle 14, and the transverse velocity of another vehicle 14. In this situation, the direction of the road center with respect to another vehicle 14 is represented as in the notation (7) below; the longitudinal velocity of another vehicle 14 is represented as in the notation (8) below; the transverse velocity of another vehicle 14 is represented as in the notation (9) below.

Direction of the lane with respect to another vehicle: $\theta_o$ ... notation (7)

Longitudinal velocity of another vehicle: $v_{x,o}$ ... notation (8)

Transverse velocity of another vehicle: $v_{y,o}$ ... notation (9)

Figure 4:
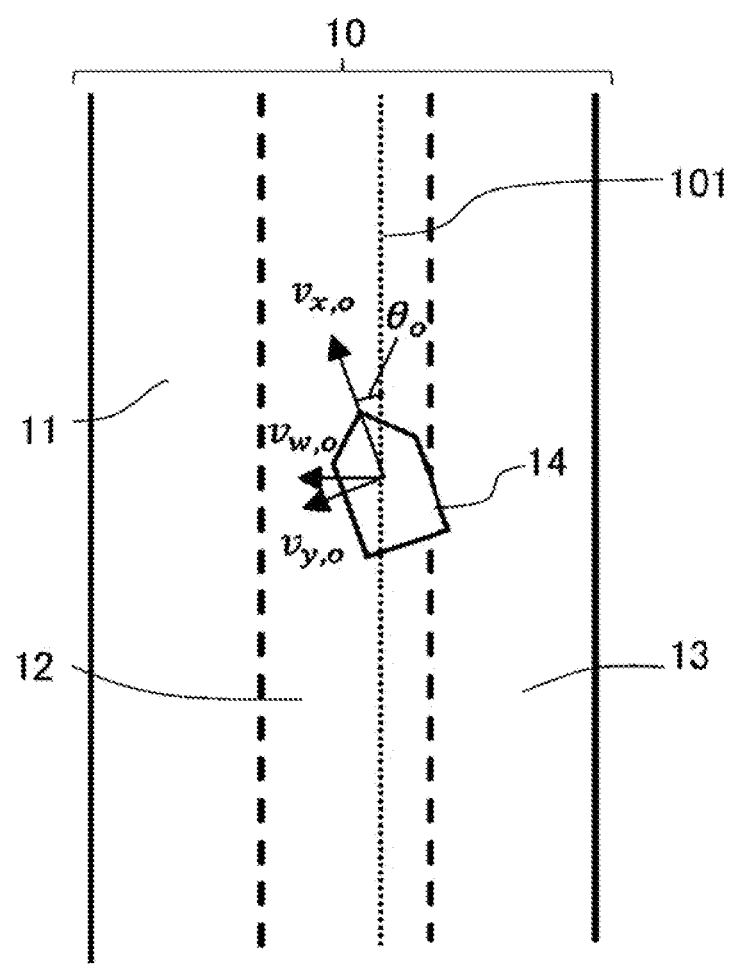
FIG. 4 is an explanatory chart representing a transverse-direction velocity of another vehicle, transformed in a direction perpendicular to a lane center, in the vehicle control apparatus according to Embodiment 1.

FIG. 4 is an explanatory chart representing the transverse-direction velocity of another vehicle, transformed in a direction perpendicular to a lane center, in the vehicle control apparatus according to Embodiment 1. As represented in FIG. 4, the transverse-direction velocity of another vehicle 14, transformed in a direction perpendicular to the center 101 of the road 10, can be calculated by the equation (1) below.

Transverse-Direction Velocity of Another Vehicle:

$$v_{w,o} = v_{x,o} \sin(\theta_o) + v_{y,o} \cos(\theta) \qquad \text{equation (1)}$$

In addition, the transverse-velocity threshold value represented in the notation (3) can be changed in accordance with the transverse-direction deviation represented in the notation (2). The transverse-direction deviation represented in the notation (2) corresponds to the gravity center position of another vehicle 14 with respect to the lane center 121 of the lane-changing destined lane 12 (refer to FIG. 2).

Figure 5:
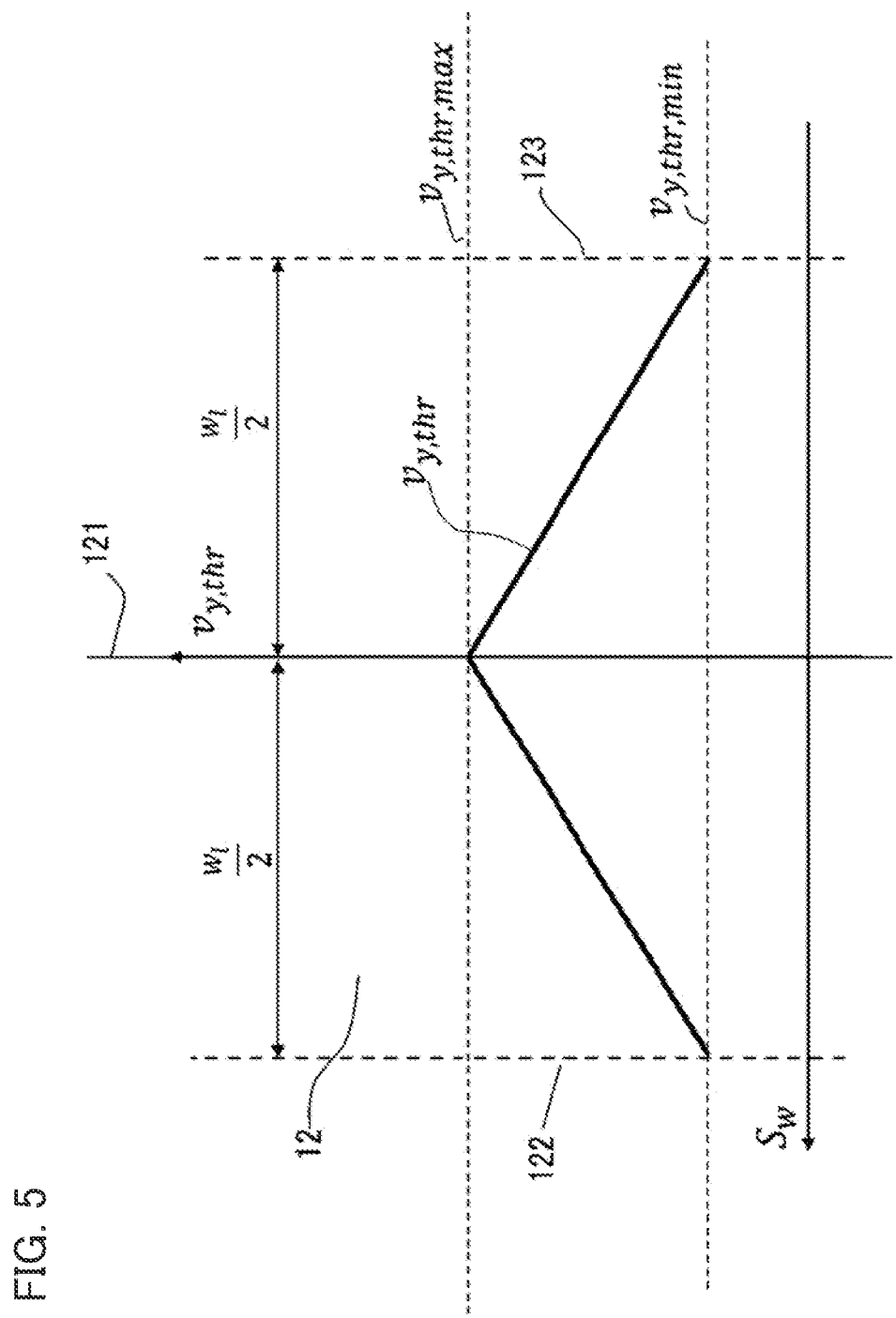
FIG. 5 is a chart representing the relationship between a transverse-direction threshold value and a lane width, in the vehicle control apparatus according to Embodiment 1.

FIG. 5 is a chart representing the relationship between a transverse-direction threshold value and a lane width, in the vehicle control apparatus according to Embodiment 1; the ordinate denotes the transverse-velocity threshold value; and the abscissa denotes the transverse-direction deviation. As represented in FIG. 5, the transverse-velocity threshold value becomes a minimal value at each of the left lane line 122 and the right lane line 123 of the lane-changing destined lane 12 and becomes a maximum value at the lane center 121. This transverse-velocity threshold value is calculated by the equation (2) below.

Transverse-Velocity Threshold Value:

$$v_{y,thr} = v_{y,thr,min} + (v_{y,thr,max} - v_{y,thr,min}) \times \frac{\frac{W_l}{2} - |S_w|}{\frac{W_l}{2}} \quad \text{equation (2)}$$

Where $v_{y,thr,max}$: maximum transverse-velocity threshold value [M/s] (=0.7)

$v_{y,thr,min}$: minimum transverse-velocity threshold value [m/s] (=0.3)

$w_l$: lane width [m] of the lane on which the gravity center of another vehicle is located As described above, the moving direction of another vehicle 14 is determined by use of the transverse-direction velocity, so that even the moving direction of another vehicle traveling straight ahead (the transverse velocity=0) obliquely from the lane can appropriately be determined. As represented in the foregoing equation (2), making the transverse-velocity threshold value changeable makes it possible that because another vehicle 14 traveling at a place apart from the lane center 121 is highly likely to be performing lane changing, the transverse-velocity threshold value is decreased so that determination of straight-ahead traveling is not likely to be performed, and makes it possible that because another vehicle 14 traveling at a place close to the lane center 121 is not likely to be performing lane changing, the transverse-velocity threshold value is increased so that the determination of straight-ahead traveling is likely to be performed.

In addition, the moving direction of another vehicle 14 can be determined by use of the lateral acceleration instead of the transverse velocity of another vehicle. That is to say, by setting a transverse-acceleration threshold value (e.g., 0.5 [m/s$^2$], determination the same as the determination, based on the transverse velocity, on the moving direction is performed. Determination, based on the transverse acceleration, on the transverse movement of another vehicle 14 makes it possible to predict increase/decrease in the transverse velocity; thus, the transverse movement of another vehicle can be determined at a timing faster than that at a time when the transverse velocity is utilized.

In addition, the transverse-acceleration threshold value can be corrected by the composite velocity of another vehicle, to be obtained from the another-vehicle-information acquisition unit 2, and the curvature radius r of the lane, to be obtained from the road-information acquisition unit 3. It is assumed that another vehicle 14 is traveling along the lane center 121 and the transverse-acceleration threshold value is corrected by centripetal acceleration, so that the moving direction can be prevented from being erroneously determined due to the effect of the transverse acceleration generated through a curve traveling. In this situation, the transverse acceleration is represented as in the notation (10) below; the transverse-acceleration threshold value is represented as in the notation (11) below; the composite velocity is represented as in the notation (12) below; the centripetal acceleration is represented as in the notation (13) below.

Transverse acceleration: $a_{y,o}$ ... notation (10)

Transverse-acceleration threshold value: $a_{y,o,thr}$ ... notation (11)

Composite velocity: $v_o$ ... notation (12)

Centripetal acceleration: $v_o^2/r$ ... notation (13)

Next, determination of a transverse-direction range will be explained. The transverse-direction range is defined by a forward minimum transverse-direction threshold value distance represented in the equation (3) below, a forward maximum transverse-direction threshold value distance represented in the equation (4) below, a backward minimum transverse-direction threshold value distance represented in the equation (5) below, and a backward maximum transverse-direction threshold value distance represented in the equation (6) below.

Each of the transverse-direction deviation of the own vehicle with respect to the position of the left lane line 122 of the lane-changing destined lane 12 as an adjacent lane and the transverse-direction deviation of the own vehicle with respect to the position of the right lane line 123 of the lane-changing destined lane 12 as the adjacent lane has a value having a sign; a positive sigh designates the left direction of each of the left lane line 122 and the right lane line 123. In order to define the range from the left lane line to the right lane line of the adjacent lane, as the transverse-direction range, the forward minimum transverse-direction threshold value distance, the forward maximum transverse-direction threshold value distance, the backward minimum transverse-direction threshold value distance, and the backward maximum transverse-direction threshold value are determined by the equations (3), (4), (5), and (6), respectively, below.

Forward Minimum Transverse-Direction Threshold Value Distance:

$$d_{f,w,thr,1} = |s_{w,e,1}| \quad \text{equation (3)}$$

Forward Maximum Transverse-Direction Threshold Value Distance:

$$d_{f,w,thr,2} = |s_{w,e,2}| \quad \text{equation (4)}$$

Backward Minimum Transverse-Direction Threshold Value Distance:

$$d_{r,w,thr,1} = |s_{w,e,1}| \quad \text{equation (5)}$$

Backward Maximum Transverse-Direction Threshold Value Distance:

$$d_{r,w,thr,2} = |s_{w,e,2}| \quad \text{equation (6)}$$

where $s_{w,e,1}$: transverse-direction deviation of the own vehicle with respect to the position of the left lane line of the adjacent lane $s_{w,e,2}$: transverse-direction deviation of the own vehicle with respect to the position of the right lane line of the adjacent lane The foregoing equations are for the case where the own vehicle performs lane changing to the right side thereof; in the case where the own vehicle performs lane changing to the left side thereof, the forward minimum transverse-direction threshold value distance, the forward maximum transverse-direction threshold value distance, the backward minimum transverse-direction threshold value distance, and the backward maximum transverse-direction threshold value are determined by the equations (7), (8), (9), and (10), respectively, below.

Forward Minimum Transverse-Direction Threshold Value Distance:

$$d_{f,w,thr,1}=|s_{w,e,2}| \quad \text{equation (7)}$$

Forward Maximum Transverse-Direction Threshold Value Distance:

$$d_{f,w,thr,2}=|s_{w,e,1}| \quad \text{equation (8)}$$

Backward Minimum Transverse-Direction Threshold Value Distance:

$$d_{r,w,thr,1}=|s_{w,e,2}| \quad \text{equation (9)}$$

Backward Maximum Transverse-Direction Threshold Value Distance:

$$d_{r,w,thr,2}=|s_{w,e,1}| \quad \text{equation (10)}$$

where $s_{w,e,1}$: transverse-direction deviation of the own vehicle with respect to the position of the left lane line of the adjacent lane $s_{w,e,2}$: transverse-direct ion deviation of the own vehicle with respect to the position of the right lane line of the adjacent lane Next, determination of a longitudinal-direction range will be explained. The longitudinal-direction range is defined by a forward threshold value distance and a backward threshold value; the forward threshold value distance and the backward threshold value are calculated by the equation (11) and (12), respectively, below.

Forward Threshold Value Distance:

$$d_{f,thr} = \begin{cases} (v_e - v_f)t_{LC} + d_{f,min} & v_e > v_f \\ d_{f,min} & \text{otherwise} \end{cases} \quad \text{equation (11)}$$

Backward Threshold Value:

$$d_{r,thr} = \begin{cases} (v_r - v_e)t_{LC} + d_{r,min} & v_r > v_e \\ d_{r,min} & \text{otherwise} \end{cases} \quad \text{equation (12)}$$

$$\text{equation (12)}$$

where $v_e$: own-vehicle speed [m/s]

$v_f$: preceding-vehicle speed [m/s]

$v_r$: following-vehicle speed [r/s]

$d_{f,min}$: minimum inter-vehicle distance from preceding vehicle [m] (=5 [m])

$d_{r,min}$: minimum inter-vehicle distance from following vehicle [m] (=5 [m])

$t_{LC}$: remaining time unitil lane changing completion [sec]

Each of the forward threshold value distance represented in the foregoing equation (11) and the backward threshold value distance represented in the foregoing equation (12) indicates a minimally necessary inter-vehicle distance for maintaining the minimum inter-vehicle distance at a time of completion of lane changing, under the assumption that each of the own vehicle and another vehicle travels at a constant speed. When each of the preceding vehicle and the following vehicle does not exists, each of the forward threshold value distance represented in the foregoing equation (11) and the backward threshold value distance represented in the foregoing equation (12) may be set to "0".

As described above, the longitudinal-direction range is a range including the forward threshold value distance represented in the foregoing equation (11) and the backward threshold value distance represented in the foregoing equation (12).

Next, correction of the longitudinal-direction range will be explained. A forward threshold value distance coefficient and a backward threshold value distance coefficient are each determined based on the moving direction of another vehicle; then, the forward threshold value distance represented in the foregoing equation (11) and the backward threshold value distance represented in the foregoing equation (12) are corrected by the equations (13) and (14), respectively, below.

$$d'_{f,thr}=c_f \times d_{f,thr} \quad \text{equation (13)}$$

$$d'_{r,thr}=c_r \times d_{r,thr} \quad \text{equation (14)}$$

where $c_f$: forward threshold value distance coefficient $c_r$: backward threshold value distance coefficient The foregoing forward threshold value distance coefficient is determined in accordance with the moving direction of preceding another vehicle; the backward threshold value distance coefficient is determined in accordance with the moving direction of following another vehicle. Table 4 below represents determination of the forward threshold value distance coefficient and the backward threshold value distance coefficient.

TABLE 4

| moving direction of preceding vehicle | forward threshold value distance coefficient $c_f$ |
| --- | --- |
| straight ahead | 1 |
| toward inside of adjacent lane | 1.2 |
| toward outside of adjacent lane | 0.6 |

| moving direction of following vehicle | backward threshold value distance coefficient $c_r$ |
| --- | --- |
| straight ahead | 1 |
| toward inside of adjacent lane | 1.2 |
| toward outside of adjacent lane | 0.6 |

Figure 6:
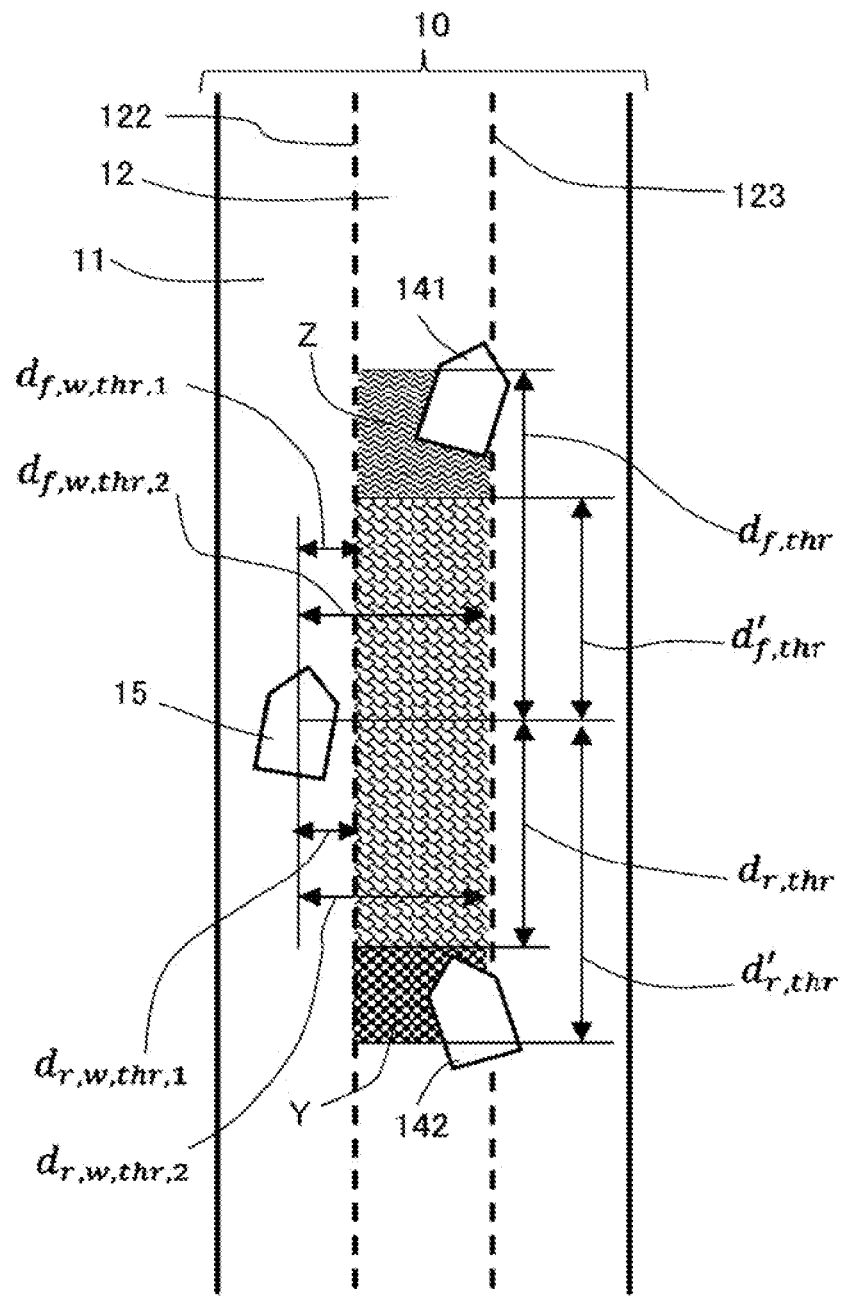
FIG. 6 is an explanatory chart representing a lane-changing cancellation determination area, in the vehicle control apparatus according to Embodiment 1.

FIG. 6 is an explanatory chart representing a lane-changing cancellation determination area, in the vehicle control apparatus according to Embodiment 1. In FIG. 6, because when following another vehicle 142 traveling after an own vehicle 15 is moving toward the inside of the lane-changing destined lane 12 as an adjacent lane, both the own vehicle 15 and following another vehicle 142 are moving toward one and the same lane, the necessity of lane-changing cancellation by the own vehicle 15 becomes high. In such a situation, by increasing the foregoing backward threshold value distance coefficient, the backward range in the longitudinal-direction range corrected according to the equation (14) is expanded by an area Y from a predetermined area, so that the lane-changing cancellation can be facilitated.

In addition, in FIG. 6, in the case where preceding another vehicle 141 traveling after the own vehicle 15 is moving toward the outside of the lane-changing destined lane 12 as an adjacent lane, another vehicle 141 is trying to move away from the adjacent lane; thus, the necessity of lane-changing cancellation becomes low. In such a situation, by decreasing the foregoing forward threshold value distance coefficient, the forward range in the longitudinal-direction range corrected according to the equation (13) is reduced by an area Z from a predetermined area, so that the lane-changing cancellation can be suppressed.

In addition, it may be allowed that the range of the forward threshold value distance represented in the equation (11) and the range of the backward threshold value distance represented in the equation (12) are changed in accordance with the transverse-direction deviation of another vehicle with respect to the lane center of the lane-changing destined lane 12 as an adjacent lane in addition to the moving direction of said another vehicle. In this case, in the case where the moving direction of another vehicle is toward the outside of the adjacent lane and the absolute value of the transverse-direction deviation of said another vehicle is larger than a predetermined threshold value (e.g., 1.0), the forward threshold value distance coefficient or the backward threshold value distance coefficient is set to, for example, 0.4, so that when the deviation degree of said another vehicle from the adjacent lane is large, the lane-changing cancellation can further be suppressed.

In addition, in the case where the moving direction of another vehicle is toward the inside of the lane-changing destined lane 12 as an adjacent lane and the absolute value of the transverse-direction deviation is larger than a predetermined threshold value (e.g., 1.5), the threshold value distance coefficient is set to, for example, 1.4, so that when the own vehicle and said another vehicle are trying to perform lane changing to one and the same lane, the lane-changing cancellation can further be facilitated.

Moreover, the threshold value of the absolute value of the transverse-direction deviation may be not a fixed value such as 1.5 but a changeable value corresponding to the respective speeds of the own vehicle and another vehicle. Furthermore, the longitudinal-direction range may be changed in accordance with the transverse-direction deviation of another vehicle with respect to the left lane line 122 between the lane-changing original lane 11 and the lane-changing destined lane 12 as an adjacent lane in addition to the moving direction of said another vehicle.

Figure 7:
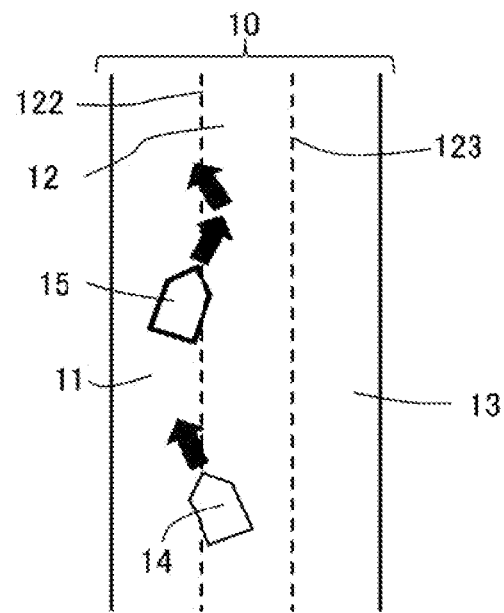
FIG. 7 is an explanatory chart representing a case where the action of an own vehicle turning to a direction the same as that of another vehicle is suppressed, in the vehicle control apparatus according to Embodiment 1.

FIG. 7 is an explanatory chart representing a case where the action of an own vehicle turning to a direction the same as that of another vehicle is suppressed, in the vehicle control apparatus according to Embodiment 1. In FIG. 7, in the case where when another vehicle 14 is trying to perform lane changing to the lane-changing original lane 11, the own vehicle 15 takes an action of returning to the lane-changing original lane 11 through its lane-changing cancellation, the own vehicle 15 moves in the same direction as another vehicle 14 moves; thus, such an action may cause abnormal approach.

Accordingly, in the case where the moving direction of another vehicle 14 is toward the lane-changing original lane 11 and the absolute value of the transverse-direction deviation of another vehicle 14 with respect to the left lane line 122 of the lane-changing destined lane 12 as an adjacent lane is smaller than a predetermined threshold value (e.g., 0.5), the backward threshold value distance coefficient is set to, for example, 0.2. The lane-changing cancellation by the own vehicle 15 can be suppressed by making the longitudinal-direction range smaller than a predetermined range, in such a manner as described above.

Figure 8:
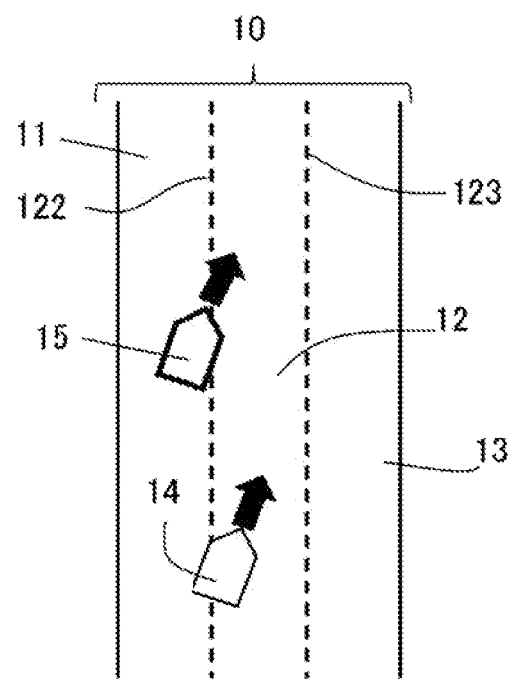
FIG. 8 is an explanatory chart representing a case where lane-changing cancellation by the own vehicle is facilitated, in the vehicle control apparatus according to Embodiment 1.

FIG. 8 is an explanatory chart representing a case where lane-changing cancellation by the own vehicle is facilitated, in the vehicle control apparatus according to Embodiment 1. In FIG. 8, in the case where when the moving direction of another vehicle 14 is toward the lane-changing destined lane 12 and the own vehicle 15 and another vehicle 14 are trying to perform lane changing to one and the same lane, the absolute value of the transverse-direction deviation of another vehicle 14 with respect to the left lane line 122 between the lane-changing original lane 11 and the lane-changing destined lane 12 as an adjacent lane is smaller than a predetermined threshold value (e.g., 0.5), the backward threshold value distance coefficient is set to, for example, 1.4. The lane-changing cancellation by the own vehicle 15 can be facilitated by making the longitudinal-direction range larger than a predetermined range, in such a manner as described above.

In addition, it may be allowed that the absolute value of the transverse-direction deviation of another vehicle 14 with respect to the left lane line 122 between the lane-changing original lane 11 and the lane-changing destined lane 12 as an adjacent lane is not a fixed value such as 0.5 but a changeable value corresponding to the respective speeds of the own vehicle 15 and another vehicle 14.

Figure 9:
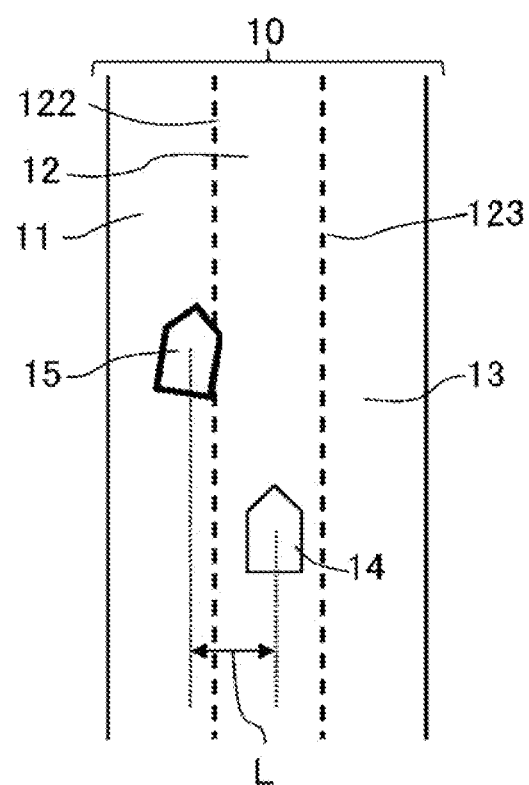
FIG. 9 is an explanatory chart representing another case where lane-changing cancellation by the own vehicle is facilitated, in the vehicle control apparatus according to Embodiment 1.

FIG. 9 is an explanatory chart representing another case where lane-changing cancellation by the own vehicle is facilitated, in the vehicle control apparatus according to Embodiment 1; FIG. 9 represents the case related to the situation where a transverse-direction distance L between the own vehicle 15 and another vehicle 14 is small. It may be allowed that when it is determined that the moving direction of another vehicle 14 is straight ahead, the longitudinal-direction range is changed in accordance with the transverse-direction distance L between the own vehicle 15 and another vehicle 14. In FIG. 9, in the case where the transverse-direction distance L between the own vehicle 15 and another vehicle 14 is smaller than a predetermined threshold value (e.g., 2.0), the backward threshold value distance coefficient is set to, for example, 0.6.

Because when the transverse-direction distance L between the own vehicle 15 and another vehicle 14 is small, it is difficult to avoid the approach to another vehicle 14 even when the own vehicle 15 takes a transverse-direction avoiding action through lane-changing cancellation, the longitudinal-direction range is reduced by setting the backward threshold value distance coefficient in such a manner as described above, so that the lane-changing cancellation by the own vehicle 15 can be suppressed.

In addition, it may be allowed that the threshold value for the transverse-direction distance L is not a fixed value such as 2.0 but a changeable value corresponding to the respective speeds of the own vehicle 15 and another vehicle 14 or the transverse-direction deviation of another vehicle 14 with respect to the lane center 121 of the adjacent lane.

In the case where the transverse-direction distance L between the own vehicle 15 and following another vehicle 14 is smaller than a predetermine threshold value and the respective moving directions of the own vehicle 15 and another vehicle 14 are different from each other, it may be allowed that the backward threshold value distance coefficient is set to, for example, 0.6 so that the longitudinal-direction range is reduced. Because when the respective moving directions of the own vehicle 15 and another vehicle 14 are the same, there exists the probability of abnormal approach, lane-changing cancellation should not be suppressed; the suppression of the lane-changing cancellation can be stopped by setting the backward threshold value distance coefficient in such a manner as described above.

Moreover, in the case where the moving direction of following another vehicle 14 is toward the outside of the adjacent lane, it may be allowed that the backward threshold value distance coefficient is set to, for example, 0.6 so that the longitudinal-direction range is reduced. When another vehicle is moving away from the adjacent lane, the necessity of lane-changing cancellation is small; the lane-changing cancellation can be suppressed by setting the backward threshold value distance coefficient in such a manner as described above.

Furthermore, in the case where the moving direction of following another vehicle 14 is toward the inside of the adjacent lane, it may be allowed that the backward threshold value distance coefficient is set to, for example, 1.2 so that the longitudinal-direction range is expanded. When another vehicle is approaching the adjacent lane, the necessity of lane-changing cancellation is large; the lane changing can be stopped by setting the backward threshold value distance coefficient in such a manner as described above.

Figure 10:
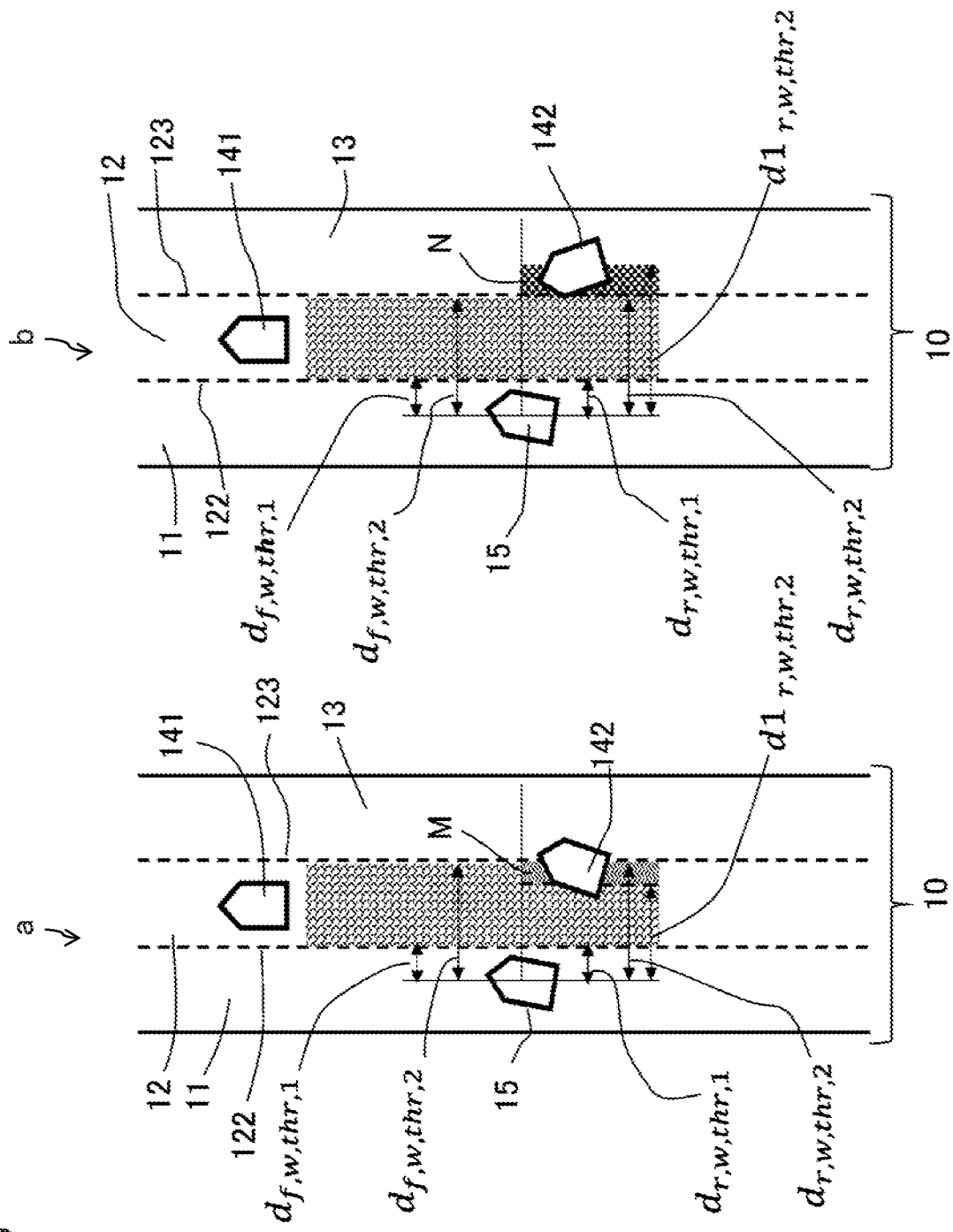
FIG. 10 is a set of explanatory charts representing another example of lane-changing cancellation determination area, in the vehicle control apparatus according to Embodiment 1.

Next, correction of the transverse-direction range will be explained. A forward minimum transverse-direction threshold value distance coefficient, a forward maximum transverse-direction threshold value distance coefficient, a backward minimum transverse-direction threshold value distance coefficient, and a backward maximum transverse-direction threshold value distance coefficient are determined based on the moving direction of another vehicle; then, the forward threshold value distance and the backward threshold value distance are corrected as follows.

$$d'_{f,w,thr,1} = c_{f,w,1} \times d_{f,w,thr,1} \quad \text{equation (15)}$$

$$d'_{f,w,thr,2} = c_{f,w,2} \times d_{f,w,thr,2} \quad \text{equation (16)}$$

$$d'_{r,w,thr,1} = c_{r,w,1} \times d_{r,w,thr,1} \quad \text{equation (17)}$$

$$d'_{r,w,thr,2} = c_{r,w,2} \times d_{r,w,thr,2} \quad \text{equation (18)}$$

where $c_{f,w,1}$: forward minimum transverse-direction threshold value distance coefficient $c_{f,w,2}$: forward maximum transverse-direction threshold value distance coefficient $c_{r,w,1}$: backward minimum transverse-direction threshold value distance coefficient $c_{r,w,2}$: backward maximum transverse-direction threshold value distance coefficient Next, there will be explained the case where when the moving direction of another vehicle is toward the outside of the adjacent lane, one of the minimum transverse-direction threshold value distance and the maximum transverse-direction threshold value distance is multiplied by a coefficient so that a transverse-direction predetermined range is reduced. FIG. 10 is a set of explanatory charts representing another example of lane-changing cancellation determination area, in the vehicle control apparatus according to Embodiment 1; the chart (a) represents the case where the moving direction of following another vehicle 142 is toward the outside of the lane-changing destined lane 12 as an adjacent lane and is moving toward the lane-changing further destined lane 13; the chart (b) represents the case where the moving direction of following another vehicle 142 is toward the inside of the lane-changing destined lane 12 as an adjacent lane.

As illustrated in FIG. 10(*a*), in the case where the moving direction of following another vehicle 142 is toward the outside of the lane-changing destined lane 12 as an adjacent lane and is moving toward the lane-changing further destined lane 13, the backward maximum transverse-direction threshold value distance coefficient is set to, for example, 0.8 so that the transverse-direction range is reduced by an area M. Lane-changing cancellation by the own vehicle 15 for following another vehicle 142 that moves from the inside of the adjacent lane toward the outside thereof can be suppressed by reducing the transverse-direction range from a predetermined range in such a manner as described above.

It may be allowed that in the case where the moving direction of another vehicle is toward the inside of the adjacent lane, the transverse-direction range is increased by multiplying one of the minimum transverse-direction threshold value distance and the maximum transverse-direction threshold value distance by a coefficient. That is to say, in the case where as represented in FIG. 10(*b*), the moving direction of following another vehicle 142 is toward the inside of the lane-changing destined lane 12 as the adjacent lane, the backward maximum transverse-direction threshold value distance coefficient is set to, for example, 1.2 so that the transverse-direction range is expanded by an area N. Lane-changing cancellation by the own vehicle 15 for another vehicle that moves from a position outside the adjacent lane to a position inside the adjacent lane can early be performed by increasing the transverse-direction range from the predetermined range in such a manner as described above.

In the foregoing explanation, the threshold value distance coefficient has been set to a value larger than 0; however, the threshold value distance coefficient can also be set to 0. Because when the threshold value distance coefficient is set to 0, the inter-vehicle distance threshold value becomes 0; thus, it can be determined that lane changing is not cancelled.

Moreover, as a method of changing the longitudinal-direction range and the transverse-direction range, instead of a method of multiplying a basic threshold value by a coefficient, the parameter of the threshold value is changed, so that the longitudinal-direction range and the transverse-direction rang cam be changed. For example, in order to expand the forward range of the longitudinal-direction range, the minimum inter-vehicle distance from a following vehicle is set to 8 m; in order to reduce the forward range of the longitudinal-direction range, the minimum inter-vehicle distance from the following vehicle is set to 2 m.

Figure 11:
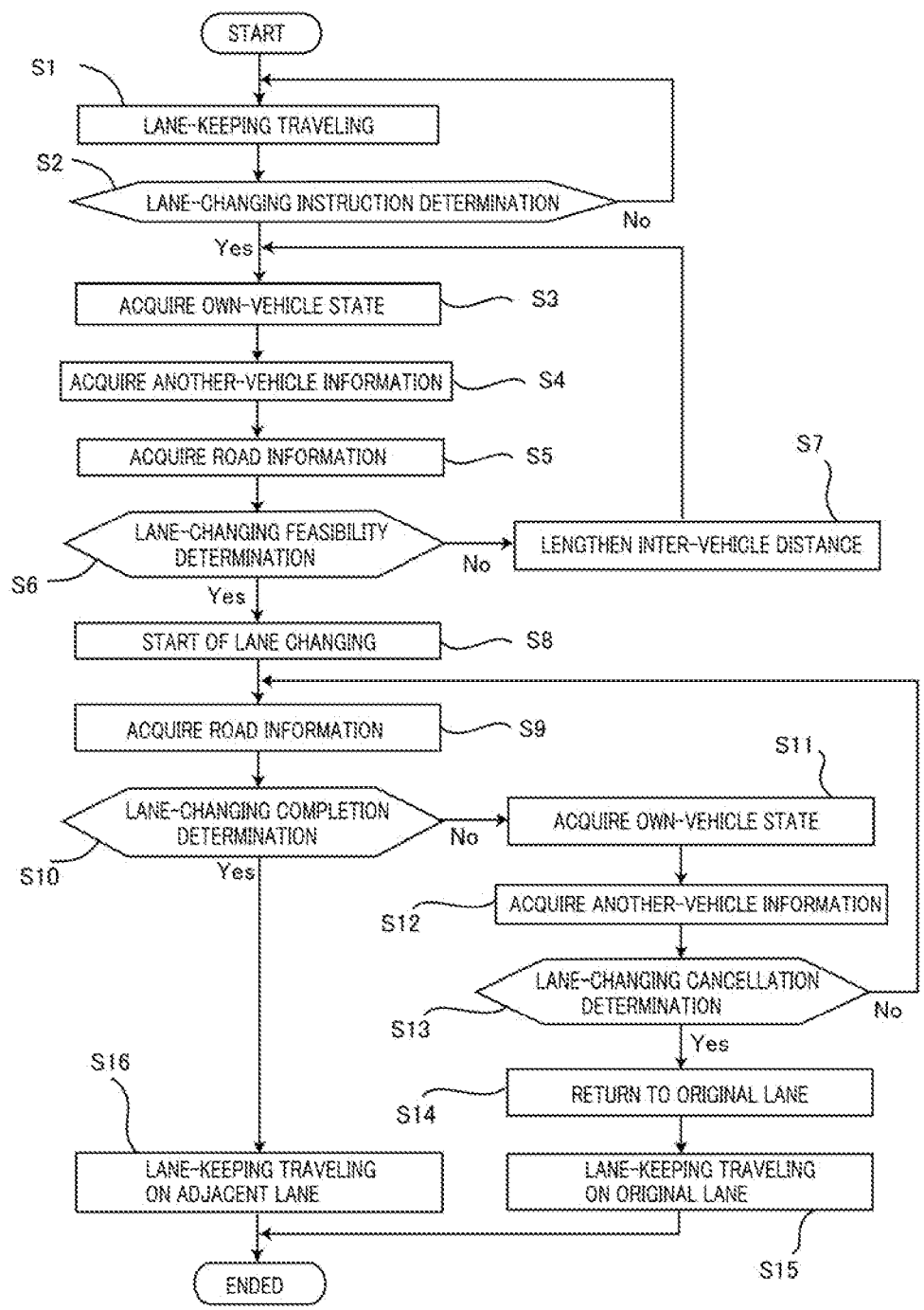
FIG. 11 is a flowchart representing processing by the vehicle control apparatus according to Embodiment 1.

Next, the processing procedure of the vehicle control apparatus according to Embodiment 1 will be explained. FIG. 11 is a flowchart representing processing by the vehicle control apparatus according to Embodiment 1. In FIG. 11, in the step S1, the own vehicle performs lane-keeping traveling by keeping the center of a lane on which it is currently traveling. In the step S2, it is determined whether or not there exists a lane-changing instruction. The determination on whether or not there exists a lane-changing instruction is performed in such a way that when a driver lights the winker, it is determined that it has been instructed to perform lane changing to a direction indicated by the winker.

In the case where it is determined in the step S2 that there exists no lane-changing instruction (No), the step S1 is resumed and the lane-keeping traveling is continued until the lane-changing instruction is issued. In the case where it is determined in the step S2 that there exists the lane-changing instruction (Yes), the step S2 is followed by the step S3, where the own-vehicle-state acquisition unit 1 acquires an own-vehicle state; then, in the step S4, the another-vehicle-information acquisition unit 2 acquires another-vehicle information. Furthermore, in the step S5, the road-information acquisition unit 3 acquires road information; then, the step S5 is followed by the step S6.

In the step S6, it is determined whether or not own vehicle can perform lane changing. In the determination, in the step S3, on whether or not the own vehicle can perform lane changing, whether or not an enough inter-vehicle distance from another vehicle is kept so that the lane changing can soundly be performed is determined, based on the own-vehicle speed, the position and the speed of said another vehicle, and the inter-vehicle distance between the own vehicle and said another vehicle. As is the case with aftermentioned determination on lane-changing cancellation, this determination on whether or not the lane changing is feasible is performed based on whether or not said another vehicle exists within the area determined by the longitudinal-direction range and the transverse-direction range or by multiplying each of the forward threshold value distance and the backward threshold value distance for the determination on the lane-changing cancellation by a predetermined coefficient (e.g., 1.2) so that the longitudinal-direction range becomes larger than a predetermined range. The multiplication by the coefficient makes it possible to prevent an unnatural action in which due to a minute situation change immediately after the start of lane changing, the lane changing is cancelled.

In the case where it is determined in the step S6 that the lane changing cannot be performed (No), the step S6 is followed by the step S7, where the target speed of the own vehicle is adjusted so as to lengthen the inter-vehicle distance from said another vehicle; then, the step S3 is resumed. In this situation, the target speed of the own vehicle is set to a value obtained by subtracting a predetermined value (e.g., 10/3.6 [m/s]) from the speed of said another vehicle.

In the case where it is determined in the step S6 that the lane changing can be performed (Yes), the step S6 is followed by the step S8, where lane changing to a lane-changing destined lane as an adjacent lane is started. While the lane changing is performed, the road information is obtained from the road-information acquisition unit 3 in the step S9; then, the step S9 is followed by the step S10, where it is determined whether or not the lane changing has been completed. In the determination, in the step S10, on the completion of the lane changing, when the gravity center of the own vehicle enters the adjacent lane, it is determined that the lane changing has been completed. In addition, it may be allowed that when the gravity center of the own vehicle sufficiently approaches the lane center of the adjacent lane, it is determined that the lane changing has been completed.

In the case where it is determined in the step S10 that the lane changing has not been completed (No), the own-vehicle state is obtained from the own-vehicle-state acquisition unit 1 in the step S11; in the step S12, another-vehicle information is obtained from the another-vehicle-information acquisition unit 2; then, in the step S13, the moving-direction determination unit 4 determines the longitudinal-direction range and the transverse-direction range, and the lane-changing-cancellation determination unit 5 determines whether or not the lane changing should be cancelled.

In the case where it is determined in the step S13 that the lane changing should be cancelled (Yes), the step S13 is followed by the step S15, where the vehicle control unit 6 makes the own vehicle return to the original lane; then, in the step S15, the own vehicle performs lane-keeping traveling on the original lane; then, the processing is ended.

In the case where it is determined in the step S13 that the lane changing should be continued (No), the step S9 is resumed; then, in the step S10, the determination on the completion of the lane changing is performed until the lane changing is completed; furthermore, as described above, in the steps S11 through S13, the lane-changing-cancellation determination is continued.

In the case where it is determined in the step S10 that the lane changing has been completed (Yes), the step S10 is followed by the step S16, where the own vehicle performs lane-keeping traveling on the adjacent lane as the lane-changing destined lane; then, the processing is ended.

With regard to the foregoing vehicle control apparatus according to Embodiment 1, because lane-changing cancellation is determined based on the moving direction of another vehicle, the lane-changing cancellation can be suppressed in the situation that although the own vehicle is approaching said another vehicle, the lane-changing cancellation is not necessary; moreover, lane changing can be cancelled in the situation although the own vehicle is still not approaching another vehicle, the lane-changing cancellation is necessary; therefore, there is demonstrated an effect in which influence on a traffic flow and the driver's feeling of discomfort are reduced.

Although the present disclosure describes exemplary Embodiment 1, it is not limited to Embodiment 1; instead, an infinite number of unexemplified variant examples are conceivable within the range of the technology disclosed in the present disclosure. For example, there are included the cases where at least one constituent element is modified, added, or omitted.

Next, the features of the vehicle control apparatus disclosed in the present disclosure will be described as appendixes, hereinafter.

(Appendix 1) A vehicle control apparatus comprising:
  an own-vehicle-state acquisition unit that acquires a state of an own-vehicle;
  an another-vehicle-information acquisition unit that acquires another-vehicle information including a position and a speed of another vehicle traveling on a road on which the own vehicle is traveling;
  a road-information acquisition unit that acquires road information including information on a lane center of an adjacent lane of a lane-changing original lane on which the own vehicle is traveling; and
  a vehicle control unit that performs lane changing by the own vehicle to the adjacent lane, based on the another-vehicle information to be acquired by the another-vehicle-information acquisition unit, the vehicle control apparatus further comprising:
  a lane-changing-cancellation determination unit that cancels the lane changing and determines whether or not the own vehicle should return to the lane-changing original lane, in the case where while the lane changing is performed, another vehicle is detected within an area determined by a predetermined longitudinal-direction range and a predetermined transverse-direction range; and
  a moving-direction determination unit that determines a moving direction of said another vehicle, based on the another-vehicle information to be acquired by the another-vehicle-information acquisition unit and the road information to be acquired by the road-information acquisition unit,
  wherein the lane-changing-cancellation determination unit changes at least one of the longitudinal-direction range and the transverse-direction range, in accordance with a moving direction of said another vehicle determined by the moving-direction determination unit.

(Appendix 2) The vehicle control apparatus according to (Appendix 1), wherein the lane-changing-cancellation determination unit changes the longitudinal-direction range, in accordance with a moving direction of said another vehicle determined by the moving-direction determination unit and a transverse-direction deviation of said another vehicle with respect to the lane center of the adjacent lane.

(Appendix 3) The vehicle control apparatus according to (Appendix 2), wherein in the case where a moving direction of said another vehicle determined by the moving-direction determination unit is toward the outside of the adjacent lane and a transverse-direction deviation of said another vehicle with respect to the lane center of the adjacent lane is larger than a predetermined threshold value, the lane-changing-cancellation determination unit makes the longitudinal-direction range smaller than a predetermined range.

(Appendix 4) The vehicle control apparatus according to (Appendix 2), wherein in the case where a moving direction of said another vehicle determined by the moving-direction determination unit is toward the inside of the adjacent lane and a transverse-direction deviation of said another vehicle with respect to the lane center of the adjacent lane is larger than a predetermined threshold value, the lane-changing-cancellation determination unit makes the longitudinal-direction range larger than a predetermined range.

(Appendix 5) The vehicle control apparatus according to (Appendix 1), wherein the lane-changing-cancellation determination unit changes the longitudinal-direction range, in accordance with a moving direction of said another vehicle determined by the moving-direction determination unit and a transverse-direction deviation of said another vehicle with respect to a lane line between the lane-changing original lane and the adjacent lane.

(Appendix 6) The vehicle control apparatus according to (Appendix 5), wherein in the case where a moving direction of said another vehicle determined by the moving-direction determination unit is toward the lane-changing original lane and a transverse-direction deviation of said another vehicle with respect to a lane line between the lane-changing original lane and the adjacent lane is smaller than a predetermined threshold value, the lane-changing-cancellation determination unit makes the longitudinal-direction range smaller than a predetermined range.

(Appendix 7) The vehicle control apparatus according to (Appendix 5), wherein in the case where a moving direction of said another vehicle determined by the moving-direction determination unit is toward the adjacent lane and a transverse-direction deviation of said another vehicle with respect to a lane line between the lane-changing original lane and the adjacent lane is smaller than a predetermined threshold value, the lane-changing-cancellation determination unit makes the longitudinal-direction range larger than a predetermined range.

(Appendix 8) The vehicle control apparatus according to (Appendix 1), wherein in the case where the moving-direction determination unit determines that said another vehicle is traveling straight ahead, the lane-changing-cancellation determination unit changes the longitudinal-direction range, in accordance with a transverse-direction distance of said another vehicle from the own vehicle.

(Appendix 9) The vehicle control apparatus according to (Appendix 8), wherein in the case where when the moving-direction determination unit determines that said another vehicle is traveling straight ahead, a transverse-direction distance of said another vehicle from the own vehicle is smaller than a predetermined threshold value, the lane-changing-cancellation determination unit makes the longitudinal-direction range smaller than a predetermined range.

(Appendix 10) The vehicle control apparatus according to (Appendix 1), wherein in the case where a transverse-direction distance between the own vehicle and said another vehicle is smaller than a predetermined threshold value and a moving direction of the own vehicle and a moving direction of said another vehicle determined by the moving-direction determination unit are different from each other, the lane-changing-cancellation determination unit makes the longitudinal-direction range smaller than a predetermined range.

(Appendix 11) The vehicle control apparatus according to (Appendix 1), wherein in the case where a moving direction of said another vehicle determined by the moving-direction determination unit is toward the outside of the adjacent lane, the lane-changing-cancellation determination unit makes the longitudinal-direction range smaller than a predetermined range.

(Appendix 12) The vehicle control apparatus according to (Appendix 1), wherein in the case where a moving direction of said another vehicle determined by the moving-direction determination unit is toward the inside of the adjacent lane, the lane-changing-cancellation determination unit makes the longitudinal-direction range larger than a predetermined range.

(Appendix 13) The vehicle control apparatus according to (Appendix 1), wherein in the case where a moving direction of said another vehicle determined by the moving-direction determination unit is toward the outside of the adjacent lane, the lane-changing-cancellation determination unit makes the transverse-direction range smaller than a predetermined range.

(Appendix 14) The vehicle control apparatus according to (Appendix 1), wherein in the case where a moving direction of said another vehicle determined by the moving-direction determination unit is toward the inside of the adjacent lane, the lane-changing-cancellation determination unit makes the transverse-direction range larger than a predetermined range.

(Appendix 15) The vehicle control apparatus according to any one of (Appendix 1) through (Appendix 14), wherein the moving-direction determination unit determines a moving direction of said another vehicle, based on the another-vehicle information to be acquired by the another-vehicle-information acquisition unit and positional information on the lane center of the adjacent lane to be acquired by the road-information acquisition unit.

(Appendix 16) The vehicle control apparatus according to any one of (Appendix 1) through (Appendix 14), wherein the moving-direction determination unit determines a moving direction of said another vehicle, based on the another-vehicle information to be acquired by the another-vehicle-information acquisition unit and positional information on a lane line of the adjacent lane to be acquired by the road-information acquisition unit.

(Appendix 17) The vehicle control apparatus according to any one of (Appendix 1) through (Appendix 16), wherein at least the vehicle control unit, the lane-changing-cancellation determination unit, and the moving-direction determination unit are provided in an ECU in the own vehicle.

What is claimed is:

1. A vehicle control apparatus comprising:
an own-vehicle-state acquisition device that acquires a state of an own-vehicle;
an another-vehicle-information acquisition device that acquires another-vehicle information including a position and a speed of another vehicle traveling on a road on which the own vehicle is traveling;
a road-information acquisition device that acquires road information including information on a lane center of an adjacent lane of a lane-changing original lane on which the own vehicle is traveling; and
a vehicle controller that performs lane changing by the own vehicle to the adjacent lane, based on the another-vehicle information to be acquired by the anothervehicle-information acquisition unit, the vehicle control apparatus further comprising:
a lane-changing-cancellation determinator that cancels the lane changing and determines whether or not the own vehicle should return to the lane-changing original lane, in the case where while the lane changing is performed, another vehicle is detected within an area determined by a predetermined longitudinal-direction range and a predetermined transverse-direction range; and
a moving-direction determinator that determines a moving direction of said another vehicle, based on the another-vehicle information to be acquired by the another-vehicle-information acquisition unit and the road information to be acquired by the road-information acquisition unit,
wherein the lane-changing-cancellation determinator changes at least one of the longitudinal-direction range and the transverse-direction range, in accordance with a moving direction of said another vehicle determined by the moving-direction determination unit.

2. The vehicle control apparatus according to claim 1, wherein the lane-changing-cancellation determination device changes the longitudinal-direction range, in accordance with a moving direction of said another vehicle determined by the moving-direction determinator and a transverse-direction deviation of said another vehicle with respect to the lane center of the adjacent lane.

3. The vehicle control apparatus according to claim 2, wherein in the case where a moving direction of said another vehicle determined by the moving-direction determinator is toward the outside of the adjacent lane and a transverse-direction deviation of said another vehicle with respect to the lane center of the adjacent lane is larger than a predetermined threshold value, the lane-changing-cancellation determinator makes the longitudinal-direction range smaller than a predetermined range.

4. The vehicle control apparatus according to claim 2, wherein in the case where a moving direction of said another vehicle determined by the moving-direction determinator is toward the inside of the adjacent lane and a transverse-direction deviation of said another vehicle with respect to the lane center of the adjacent lane is larger than a predetermined threshold value, the lane-changing-cancellation determinator makes the longitudinal-direction range larger than a predetermined range.

5. The vehicle control apparatus according to claim 2, wherein the moving-direction determinator determines a moving direction of said another vehicle, based on the another-vehicle information to be acquired by the another-vehicle-information acquisition device and positional information on the lane center of the adjacent lane to be acquired by the road-information acquisition device.

6. The vehicle control apparatus according to claim 2, wherein the moving-direction determinator determines a moving direction of said another vehicle, based on the another-vehicle information to be acquired by the another-vehicle-information acquisition device and positional information on a lane line of the adjacent lane to be acquired by the road-information acquisition device.

7. The vehicle control apparatus according to claim 2, wherein at least the vehicle controller, the lane-changing-cancellation determinator, and the moving-direction determinator are provided in an ECU in the own vehicle.

8. The vehicle control apparatus according to claim 1, wherein the lane-changing-cancellation determinator changes the longitudinal-direction range, in accordance with a moving direction of said another vehicle determined by the moving-direction determinator and a transverse-direction deviation of said another vehicle with respect to a lane line between the lane-changing original lane and the adjacent lane.

9. The vehicle control apparatus according to claim 8, wherein in the case where a moving direction of said another vehicle determined by the moving-direction determinator is toward the lane-changing original lane and a transverse-direction deviation of said another vehicle with respect to a lane line between the lane-changing original lane and the adjacent lane is smaller than a predetermined threshold value, the lane-changing-cancellation determinator makes the longitudinal-direction range smaller than a predetermined range.

10. The vehicle control apparatus according to claim 8, wherein in the case where a moving direction of said another vehicle determined by the moving-direction determinator is toward the adjacent lane and a transverse-direction deviation of said another vehicle with respect to a lane line between the lane-changing original lane and the adjacent lane is smaller than a predetermined threshold value, the lane-changing-cancellation determinator makes the longitudinal-direction range larger than a predetermined range.

11. The vehicle control apparatus according to claim 1, wherein in the case where the moving-direction determinator determines that said another vehicle is traveling straight ahead, the lane-changing-cancellation determinator changes the longitudinal-direction range, in accordance with a transverse-direction distance of said another vehicle from the own vehicle.

12. The vehicle control apparatus according to claim 11, wherein in the case where when the moving-direction determinator determines that said another vehicle is traveling straight ahead, a transverse-direction distance of said another vehicle from the own vehicle is smaller than a predetermined threshold value, the lane-changing-cancellation determinator makes the longitudinal-direction range smaller than a predetermined range.

13. The vehicle control apparatus according to claim 1, wherein in the case where a transverse-direction distance between the own vehicle and said another vehicle is smaller than a predetermined threshold value and a moving direction of the own vehicle and a moving direction of said another vehicle determined by the moving-direction determinator are different from each other, the lane-changing-cancellation determinator makes the longitudinal-direction range smaller than a predetermined range.

14. The vehicle control apparatus according to claim 1, wherein in the case where a moving direction of said another vehicle determined by the moving-direction determinator is toward the outside of the adjacent lane, the lane-changing-cancellation determinator makes the longitudinal-direction range smaller than a predetermined range.

15. The vehicle control apparatus according to claim 1, wherein in the case where a moving direction of said another vehicle determined by the moving-direction determinator is toward the inside of the adjacent lane, the lane-changing-cancellation determinator makes the longitudinal-direction range larger than a predetermined range.

16. The vehicle control apparatus according to claim 1, wherein in the case where a moving direction of said another vehicle determined by the moving-direction determinator is toward the outside of the adjacent lane, the lane-changing-cancellation determinator makes the transverse-direction range smaller than a predetermined range.

17. The vehicle control apparatus according to claim 1, wherein in the case where a moving direction of said another vehicle determined by the moving-direction determinator is toward the inside of the adjacent lane, the lane-changing-cancellation determinator makes the transverse-direction range larger than a predetermined range.

18. The vehicle control apparatus according to claim 1, wherein the moving-direction determinator determines a moving direction of said another vehicle, based on the another-vehicle information to be acquired by the another-vehicle-information acquisition device and positional information on the lane center of the adjacent lane to be acquired by the road-information acquisition device.

19. The vehicle control apparatus according to claim 1, wherein the moving-direction determinator determines a moving direction of said another vehicle, based on the another-vehicle information to be acquired by the another-vehicle-information acquisition device and positional information on a lane line of the adjacent lane to be acquired by the road-information acquisition device.

20. The vehicle control apparatus according to claim 1, wherein at least the vehicle controller, the lane-changing-cancellation determinator, and the moving-direction determinator are provided in an ECU in the own vehicle.

* * * * *